Feb. 27, 1934.  S. L. WEBER ET AL  1,948,552
RAY AVIATION COMPASS
Filed May 16, 1932   2 Sheets-Sheet 1
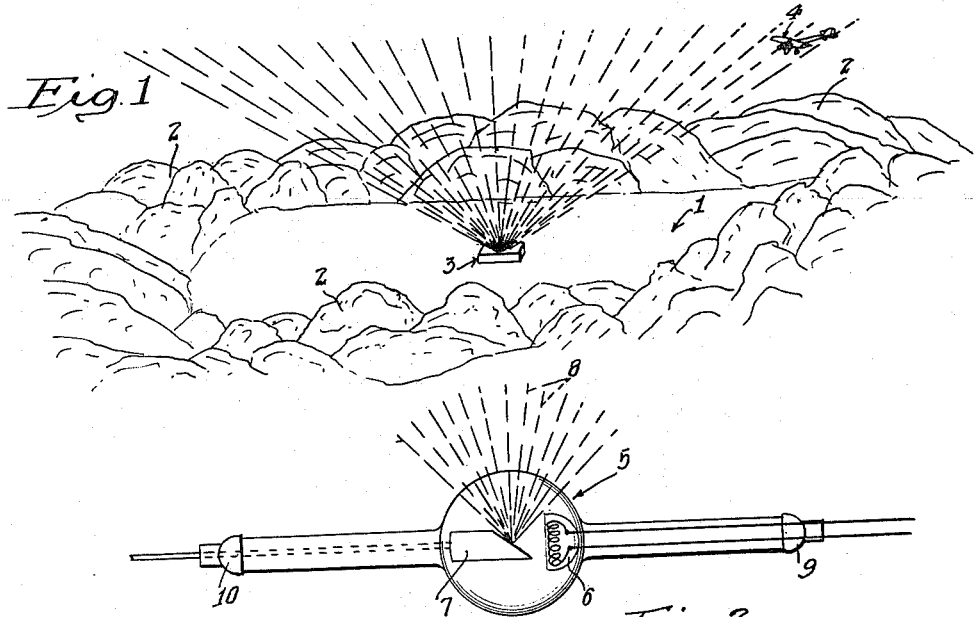
Fig.1
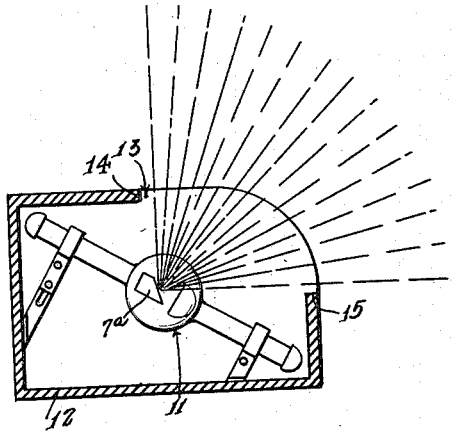
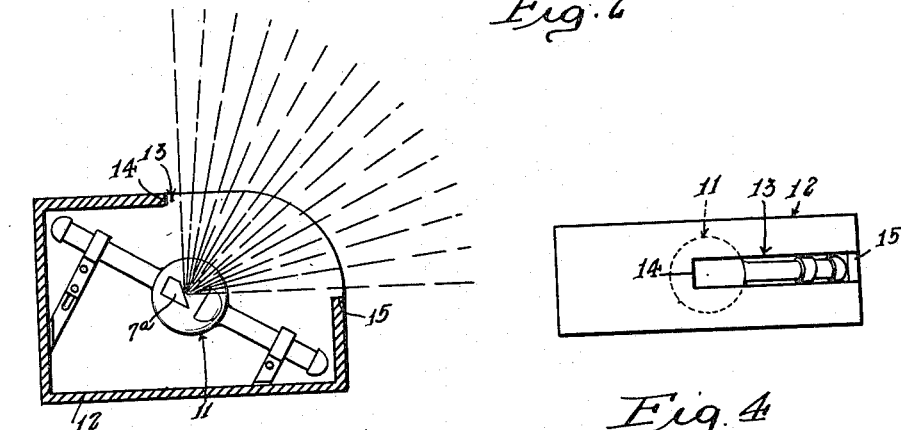
Fig.2
Fig.3
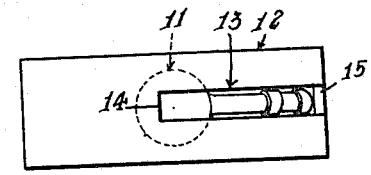
Fig.4
Inventors
Sigvard Leo Weber
Brydon Baker
Edward W. Jensen
By Lyon & Lyon
Attorneys Feb. 27, 1934.    S. L. WEBER ET AL    1,948,552
RAY AVIATION COMPASS
Filed May 16, 1932    2 Sheets-Sheet 2
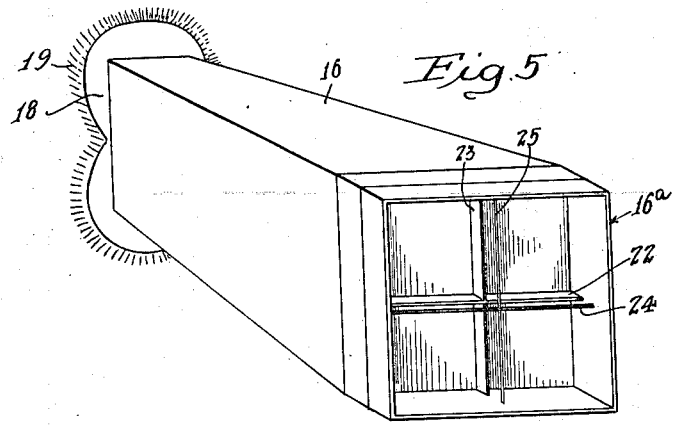
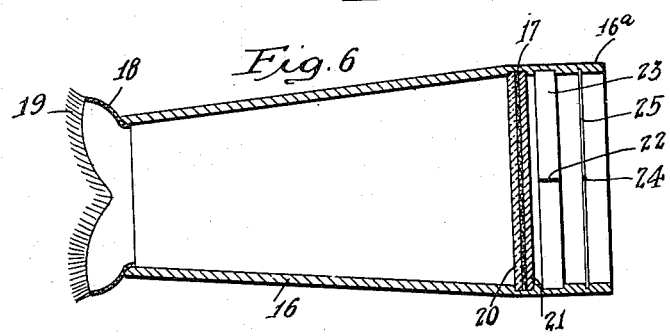
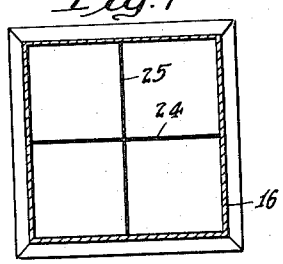
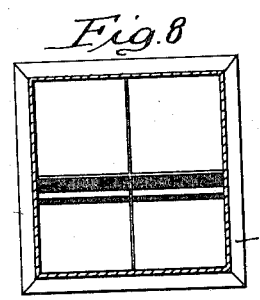
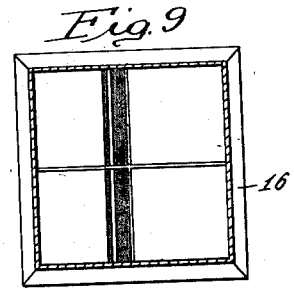
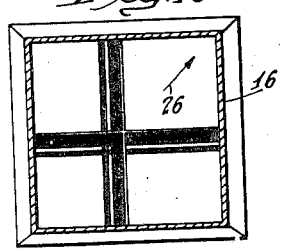
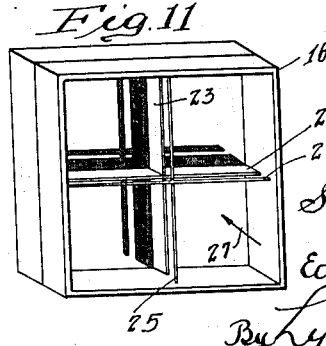
Inventors
Sigvard Leo Weber
Brydon Baker
Edward W. Jensen
By Lyon & Lyon
Attorneys Patented Feb. 27, 1934

1,948,552

UNITED STATES PATENT OFFICE 1,948,552

RAY AVIATION COMPASS

Sigvard Leo Weber, Brydon Baker, and Edward W. Jensen, Los Angeles, Calif.

Application May 16, 1932. Serial No. 611,466

7 Claims. (Cl. 250—11)

This invention relates to beacons for aircraft and has as a broad object to provide apparatus for producing an indication on board aircraft of the position of the craft during times when the earth is obscured from view by fog or clouds.

A specific object is to provide a simple receiving device responsive to Roentgen rays for indicating the existence of such rays and the direction of their source.

It is present practice to use beacon lights at intervals along established airways and at landing fields, for guiding airplanes. Such beacons are readily visible in clear weather but are useless in thick weather. Radio beacons have been proposed for use under conditions of poor visibility, but they are open to the objection that relatively complicated receiving equipment is required to indicate the direction of the radio beacon.

In accordance with the present invention we propose to use a source of Roentgen rays as a beacon and determine the position of aircraft relative to the beacon by detecting the presence and direction of the Roentgen rays with a specially designed fluoroscope to be described in detail in the following specification. The chief advantages of the system are that the Roentgen rays are very penetrating, passing readily through fog and clouds, and that the receiving system is simple, cheap, rugged and can be operated by anyone without special training.

Referring to the drawings:

Figure 1 is a perspective view illustrating how a Roentgen ray beacon may be positioned on an aircraft landing field;

Figure 2 is a detail view showing how a conventional Roentgen ray tube may be utilized to produce a diverging beam as shown in Figure 1;

Figure 3 is a detail elevational sectional view of a Roentgen ray tube enclosed in a special housing to confine the radiation to a fan shaped beam;

Figure 4 is a plan view of the apparatus shown in Figure 3;

Figure 5 is a perspective view of a direction indicating fluoroscope in accordance with the invention;

Figure 6 is a longitudinal sectional view of the fluoroscope shown in perspective in Figure 5;

Figures 7, 8, 9, and 10 comprise diagrams illustrating the operation of the fluoroscope; and Figure 11 is a perspective view of the outer end of the fluoroscope showing the shadows cast by Roentgen rays impinging on the device.

Referring to Figure 1, we have shown a landing field 1, which may be located in the midst of hills 2, equipped with a Roentgen ray beacon 3 for radiating a broad divergent beam of Roentgen rays upward in the form of an inverted cone. An airplane 4 is schematically shown as approaching the field and exposed to the beam of Roentgen rays from the beacon 3. It will be apparent from inspection of Figure 1 that if the airplane 4 is equipped with some device for indicating the direction of propagation of the Roentgen rays emanating from the beacon 3, the aviator will be able to ascertain the direction of the landing field 1 even though the earth below him is entirely obscured from view by fog or clouds.

The particular means for generating Roentgen rays to be used as the source 3 in Figure 1 is not a part of our invention but it may comprise a conventional Roentgen ray tube as shown in Figure 2, which tube comprises a glass envelope 5, a cathode 6 for emitting electrons, and an anode 7 upon the surface of which Roentgen rays are generated and radiated by impact at high velocity of electrons from the cathode 6. The type of tube illustrated in Figure 2 is in common use and it is known that a tube of this sort radiates Roentgen rays in the form of a divergent beam as outlined by the dotted lines 8, the exact direction of radiation being dependent upon the position of the anode 7 and on the angle of impact of the electrons on the anode face. The cathode 6 and anode 7 are connected to terminals 9 and 10 respectively on the exterior of the envelope 5 which terminals may be connected to any source of electrical potential of sufficient intensity to operate the tube. Since apparatus for energizing Roentgen ray tubes is old and well known, such apparatus has not been disclosed in the drawings.

As previously indicated, a Roentgen ray tube of the type shown in Figure 2 produces a cone-shaped beam which would extend horizontally in all directions as shown in Figure 1. Such a beam (as shown in Figure 1) serves the purpose of guiding aircraft to the beacon from any and all points of the compass, and would be particularly useful in connection with landing fields from which airways lead in all directions. A conical beam as shown in Figure 1 will not serve to guide aircraft on a given course as the craft would always be in the Roentgen ray field no matter from what direction it approached the beacon.

In some instances it may be desirable to produce a constricted beam of Roentgen rays limited to a zone extending along a definite airway. By means of such a beam an aviator can maintain his craft directly on its course at all times by keeping within the beam. Means for producing a beam of this type is disclosed in Figures 3 and 4 which show a Roentgen ray tube 11, similar to that shown in Figure 2, enclosed within a housing 12 of lead or other material substantially impervious to Roentgen rays. The housing 12 is provided with a slit 13 extending from a point 14 substantially vertical with respect to the anode 7a to a point 15 substantially horizontal with respect to the anode. The width of the slit is determined by the width of the beam it is desired to project and may be such as to produce a beam having a divergence horizontally of from 5 degrees or less to fifteen degrees or more. The apparatus disclosed in Figures 3 and 4 would therefore produce a fan-shaped beam having a lateral divergence of only a few degrees and having a vertical divergence of substantially ninety degrees, that is extending from the horizon to the zenith. When such a beam is directed along the line of an airway, aviators equipped with a Roentgen ray detecting device, such as will be described below, will be enabled to ascertain at all times whether they are on or off of their course by noting whether they are within or without the Roentgen ray beam.

To enable aviators to ascertain their position and direction of flight relative to the direction of a source of Roentgen rays, we provide a special fluoroscope as illustrated in Figures 5 and 6. This fluoroscope comprises an elongated case 16 of light-proof material having a fluorescent screen 17 sensitive to Roentgen rays mounted in one end thereof and having a head piece 18 mounted upon the other end. Head piece 18 is dimensioned and shaped to fit about the eyes of an observer and is provided with fur trim 19 about the edges to form a light-tight seal with the head of the observer. The fluorescent screen 17 is preferably of slightly larger dimensions than the head piece 18 and the case 16 is therefore tapered outwardly from the head piece 18 to the fluorescent screen 17, as shown.

As shown in the sectional view of Figure 6 the fluorescent screen 17 is mounted between a plate of lead glass 20 and a piece of cardboard or similar material 21. The lead glass 20 is transparent to light but is opaque to Roentgen rays. It therefore permits the observer to see the fluorescent screen 17 while at the same time blocking the passage of any Roentgen rays that might pass through the screen 17. The cardboard wall 21 serves to protect the fluorescent screen 17 from mechanical injury and at the same time prevent the entry of any light within the case 16. It is essential to provide such a light seal as the fluorescence produced upon the screen 17 by Roentgen rays is relatively feeble and might not be observable if any appreciable amount of light were allowed to leak through to the surface of the screen. The cardboard plate 21 has substantially no impeding effect upon the Roentgen rays.

A fluoroscope as described indicates the presence of Roentgen rays because of the fluorescence of the screen 17 when exposed to the rays. However, it would not indicate with any great degree of accuracy the direction of propagation of the days. For the purpose of indicating the direction of propagation of the rays, a pair of crossed shadow plates 22 and 23 and a pair of crossed shadow bars 24 and 25 are provided in front of the fluorescent screen 17 and spaced slightly therefrom and from each other. The shadow plates and bars may be conveniently supported from the extended walls 16a of the case 16. The shadow plates and shadow bars are constructed of lead or other dense material substantially opaque to Roentgen rays and are of substantially the same lateral dimensions. That is, the thickness of each of the shadow plates 22 and 23 is substantially the same as the diameter of the shadow bars 24 and 25. It therefore follows that Roentgen rays impinging perpendicularly upon the fluorescent screen 17 will produce a single pair of thin crossed shadows on the fluorescent screen, as shown in Figure 7, and an aviator upon seeing thin crossed shadows in the fluoroscope as shown in Figure 7 will know that the instrument is pointed directly toward the Roentgen ray beacon and that by guiding his craft in the direction in which the fluoroscope is pointed he will approach the beacon.

If the fluoroscope, instead of being oriented to directly face the source of Roentgen rays, is directed too low, the vertical plate 23 and the vertical bar 25 will still produce a thin vertical shadow, as shown in Figure 8, but the horizontal plate 22 will produce a relatively broad horizontal shadow and the horizontal bar 24 will produce a second, separate horizontal shadow therebelow. The appearance of these shadows immediately informs the observer that the fluoroscope is directed too low and that by raising it until he gets a single thin horizontal shadow as shown in Figure 7, the instrument will be pointed directly at the Roentgen ray source.

If the fluoroscope is directed at the proper elevation, but to one side of the Roentgen rays source, a thin horizontal shadow will be produced but the vertical plate 23 will produce a broad vertical shadow and the vertical bar 25 will produce a separate, narrow vertical shadow as shown in Figure 9. When such a shadow is obtained, the observer will swing the forward end of the fluoroscope to the right until he obtains a single thin vertical shadow, which will inform him that the instrument is pointed directly toward the source.

If the fluoroscope is misdirected both horizontally and vertically with respect to the source, double horizontal and vertical shadows will be produced as shown in Figure 10. If such a shadow is obtained, the forward end of the instrument should be swung in the direction indicated by the arrow 26 until the double shadows disappear, when the instrument would be properly directed toward the source.

The perspective view of Figure 11 shows clearly how the double shadows will be produced by Roentgen rays impinging obliquely on the fluorescent screen 17 from the lower right hand corner as indicated by the arrow 27.

It will be observed from the foregoing description that we have provided a simple and effective aircraft beacon capable of functioning under all weather conditions, together with a device for detecting the presence and direction of propagation of Roentgen rays on board an aircraft, the detecting device being extremely simple, fool-proof, light in weight, and capable of being operated by any aviator without special training.

We claim:

1. A device for indicating the direction of propagation of Roentgen rays comprising a fluorescent screen rendered luminous by impact of said rays thereon, means opaque to said rays positioned immediately in front of said screen for producing a shadow thereon, and second means opaque to said rays positioned directly in front of said first means for also producing a shadow on said screen, whereby the shadows produced by said two means overlap when Roentgen rays impinge on said screen at a predetermined angle and are separately visible when said rays impinge on said screen at another, different angle.

2. A device for indicating the direction of propagation of Roentgen rays comprising a fluorescent screen adapted to be rendered luminous by impact of said rays thereon, a shadow-producing element of material opaque to Roentgen rays positioned in front of said screen, said element being of larger dimension in a direction perpendicular to said screen than in a direction parallel to said screen, whereby it projects a narrower shadow on said screen in response to Roentgen rays impinging on said screen perpendicularly than to Roentgen rays impinging on the screen obliquely, and a second-shadow producing element similar in shape to said first element but of reduced dimension in a direction perpendicular to said screen and mounted in spaced relation directly in front of said first element, whereby it projects a shadow on said screen coincident with the shadow projected by said first element in response to Roentgen rays impinging on said screen perpendicularly and projects a narrower shadow displaced from the shadow of said first element in response to Roentgen rays impinging on said screen obliquely thereto.

3. In navigation the method of indicating the direction of a reference point on board a moving craft that comprises radiating Roentgen rays from the reference point, intercepting some of said rays on board said craft, and determining the direction of propagation of the intercepted rays.

4. In navigation the method of indicating the direction of a reference point from on board a moving craft that comprises radiating Roentgen rays from the reference point, intercepting some of said rays on board said craft, producing a shadow with the intercepted rays, and producing a direct visible indication of the direction of projection of said shadow.

5. Means for navigating a moving craft comprising, in combination, means for radiating Roentgen rays from a reference point, and means on the craft for intercepting rays radiated from said source and producing a visible indication of their direction of propagation.

6. A device for indicating the direction of propagation of Roentgen rays comprising a fluorescent screen rendered luminous by impact of rays thereon, and means comprising a horizontal and a vertical bar, crossed with respect to each other, and positioned directly in front of said first means, said bars being dimensioned larger in a direction perpendicular to the plane of said screen than in a plane parallel to said screen and being constructed of material substantially opaque to Roentgen rays, whereby they cast shadows upon said screen, the widths of which shadows and the positions of which shadows vary depending upon the angle of incidence of Roentgen rays upon said screen.

7. Means for navigating a moving craft comprising in combination, means for radiating Roentgen rays from a reference point and means on the craft for producing a visible indication of the direction of propagation of the rays, said last means comprising an object opaque to Roentgen rays in combination with means for producing a direct visible indication of the direction of projection of the shadow cast by said object

SIGVARD LEO WEBER.
BRYDON BAKER.
EDWARD W. JENSEN.